United States Patent

[11] 3,562,477

| [72] | Inventor | Bernard Ronald Macmanus<br>Brighton, Sussex, England |
|---|---|---|
| [21] | Appl. No. | 792,105 |
| [22] | Filed | Jan. 17, 1969 |
| [45] | Patented | Feb. 9, 1971 |
| [73] | Assignee | National Research Development Corporation<br>London, England<br>a corporation of Great Britain |
| [32] | Priority | Feb. 5, 1968, Oct. 9, 1968 |
| [33] | | Great Britain |
| [31] | | 5643/68 and 47912/68 |

[54] MACHINE TOOLS
8 Claims, 9 Drawing Figs.

[52] U.S. Cl.................................................. 219/68,
82/1
[51] Int. Cl..................................................... B23p 1/00
[50] Field of Search...........................................82/1.4, 916;
219/7.5 (Inquired), 69V, 10.77 (Inquired), 50, 68

[56] References Cited
UNITED STATES PATENTS

| 2,059,236 | 11/1936 | Holslag......................... | 82/1.4X |
| 2,600,453 | 6/1952 | Weingart....................... | 219/7.5 |
| 3,095,532 | 6/1963 | Floyd............................ | 82/1.4X |

*Primary Examiner*—Leonidas Vlachos
*Attorney*—Cushman, Darby & Cushman

ABSTRACT: A method of controlling and reducing the amplitude of vibration of a machine tool during machining of a workpiece comprises measuring the frequency of vibration of a machine tool during use of the machine tool, producing pulses of electrical current at the frequency of the vibration, and applying the pulses of current to the cutting zone, in a predetermined phase relationship to the tool vibration, so as to heat the cutting zone, thereby reducing or at least limiting the amplitude of vibration.

MACHINE TOOLS

This invention relates to a device for reducing or limiting the amplitude of vibration of a machine tool during machining of a workpiece. Self-excited machine tool vibration can have adverse affects on tool wear, work surface finish and production rate.

Although in conventional machine tools it is possible to choose operating conditions, so as to avoid cutting speeds at which major vibrations occur, this is sometimes inconvenient and in numerically controlled machines may be impossible.

An object of the invention is to provide a means of controlling and reducing the vibration which is related to the frequency of the vibration.

According to the invention a method of controlling and reducing the amplitude of vibration of a machine tool during machining of a workpiece comprises measuring the frequency of vibration of a machine tool during use of the machine tool producing pulses of electrical current at the frequency of the vibration, and applying the pulses of current to the cutting zone, in a predetermined phase relationship to the tool vibration, so as to heat the cutting zone, thereby reducing or at least limiting the amplitude of vibration. The frequency of vibration can be obtained either by measuring the dynamic tool displacement or by measuring the dynamic cutting forces.

From another aspect the invention comprises an apparatus for use with a machine tool. The apparatus including a transducer adapted to produce a signal indicative of the frequency of vibration of the tool, means to produce a series of pulses of electrical current, which are in a predetermined phase relationship to the vibration and means to apply the current across the tool/workpiece area to heat this area and thus to reduce the amplitude of vibration of the tool. Preferably the apparatus includes a phase correction circuit, so that the phase of the heating current pulses can be altered relatively to the phase of the tool vibration.

Preferably also the apparatus includes means for converting the transducer signal to a series of pulses preferably by half wave rectification and a power amplifier to amplify the pulses so as to provide sufficient heating current.

Preferably there are means to vary the gain of the system, the gain being defined as the electrical current in amps divided by the amplitude of vibration.

In accordance with the invention by increasing the system gain, stabilization can be obtained with virtually zero current, subject to the choice of the correct phase relationship between the heating pulses and the tool vibration.

Figure 1:
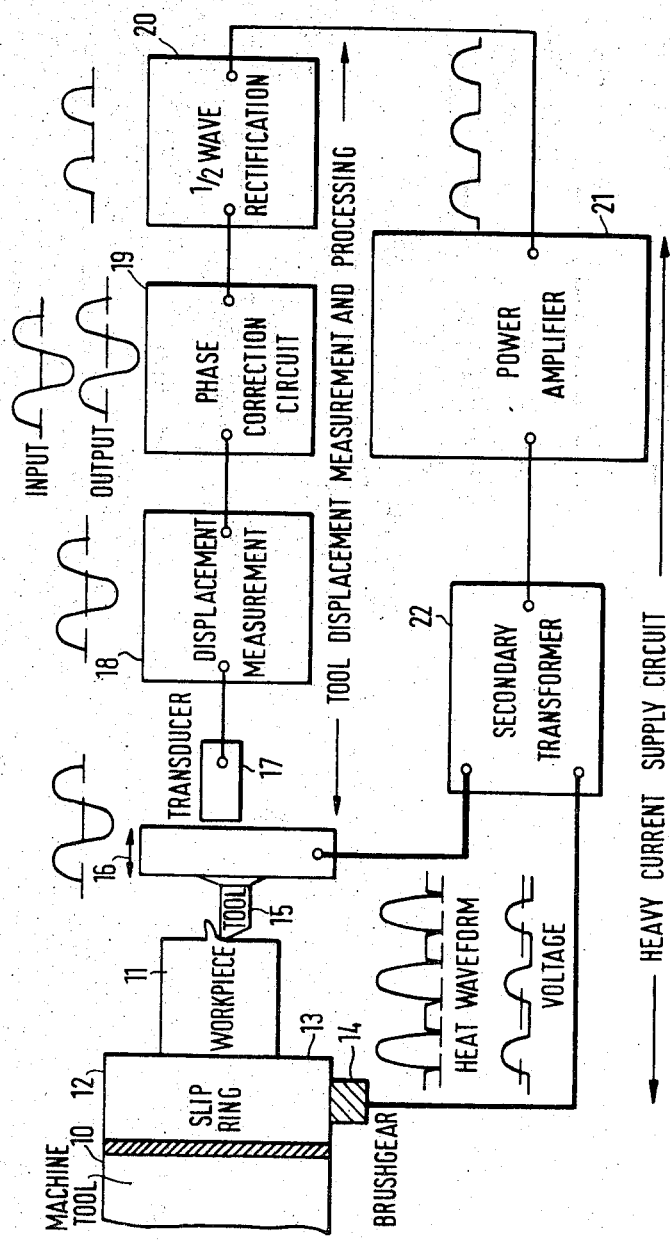
FIG. 1 is a block diagram of a stabilization system incorporating the invention applied to a machine tool.

In FIG. 1 a machine tool 10 carries a rotating workpiece 11 which is electrically insulated from the machine tool by insulator block 12. An electrical current can be applied to the workpiece 11 via a slip ring 13 which rotates with the workpiece and a brush 14.

The workpiece is being operated on by a tool 15 which, in the course of a cutting operation, has a critical direction of vibration in the direction shown by arrows 16.

The vibrations are made to induce a signal in a transducer 17 which signal will have a frequency and an amplitude related to the frequency and amplitude of the vibration of the tool. The transducer signal is applied to a circuit 18 for measurement of the displacement and the signal is applied through a phase correction circuit 19 to a half wave rectifier 20. The output of the half wave rectifier 20 will be a series of pulses, the frequency of which will be the frequency of vibration of the tool and the amplitude of which will correspond to the amplitude of vibration of the tool. The phase of this train of pulses may be varied by the phase correction circuit.

The train of pulses is then amplified by a power amplifier 21 and put through a secondary transformer 22, the output winding of which is connected between the brush 14 and the tool 16, so that a series of heating current pulses are passed through the workpiece and tool to heat the cutting zone. The amplitude of the current pulses is varied by varying the gain of the amplifier 21. This heating effect limits the amplitude of vibration and with the proper combination of phase and amplitude of the heating current pulses the amplitude of vibration of the tool may be considerably reduced or even eliminated.

The best results have been achieved using heating current pulses the voltage of which leads the phase of vibration of the tool by about 135°. Good results are obtained when the heating current pulses lead the phase of the vibration by anything between 90° and 180°. The best phase relationship for a particular job is dependent on the actual frequency of vibration.

Adjustment of the system gain, which is defined as the electrical current in amps divided by the vibration amplitude in thousands of an inch peak to peak results in stabilization being achieved with virtually zero current at the optimum phasing of heating pulses to tool displacement.

Figure 2:
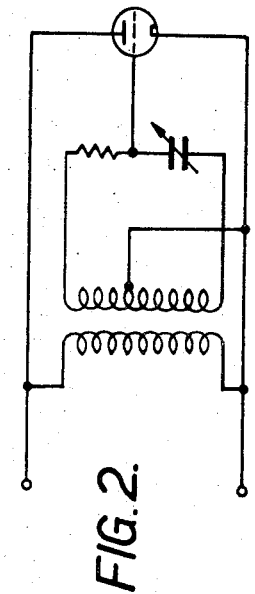
FIG. 2 is a more detailed diagram of the phase correction circuit which forms part of FIG. 1.

In one test run in which a tungsten carbide tool with zero rake angle, and a 15° clearance angle was used with an orthogonal cut on a mild steel (EN 2) workpiece, the tool was flexibly mounted so as to be equivalent to a boring bar in terms of stiffness. The cutting speed was 320 feet per minute with a cut of thirty-thousandths of an inch in width and the tool was advanced three and half thousands of an inch per revolution. A tool vibration developed of substantial amplitude but by switching on the stabilization system and adjusting the phase correction circuit until the heat pulses lead to tool vibration by 137° the vibration was reduced. By adjustment of the system gain the vibration was eventually reduced to minimal amplitude at the same time using virtually no current as illustrated in FIG. 2.

Figure 3:
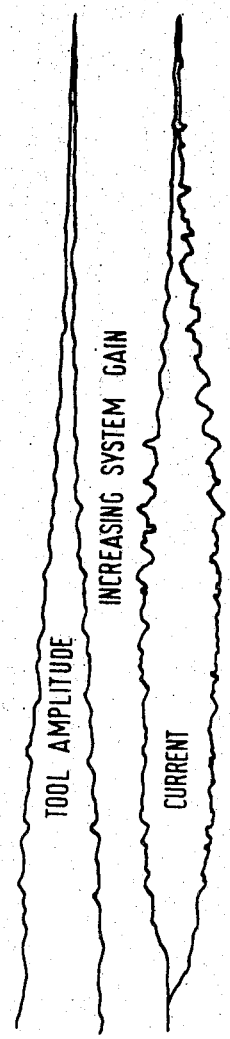
FIG. 3 is a trace showing in the upper part the amplitude of tool vibration and in the lower part the amplitude of the current with system gain increasing from left to right.

FIG. 3 shows the decay of the amplitude of vibration of the tool with increasing system gain. Initially the current rises but as the tool amplitude begins to fall off the point is reached at which both the current and the tool amplitude are falling. As can be seen from the right-hand portion of the trace a point is eventually reached where a very low current maintains a very low amplitude of vibration.

The effect of changing the phase relationship between the voltage of the heating current and the displacement of the tool is shown in FIGS. 4 to 9.

Figure 4:
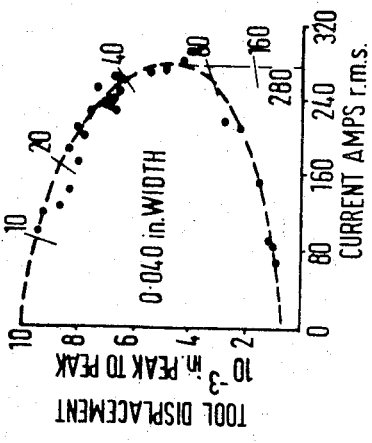
FIGS. 4 to 9 are graphs of tool displacement peak to peak in thousands of an inch against current in amps rms for different phase relationships between the voltage and the displacement.
Figure 5:
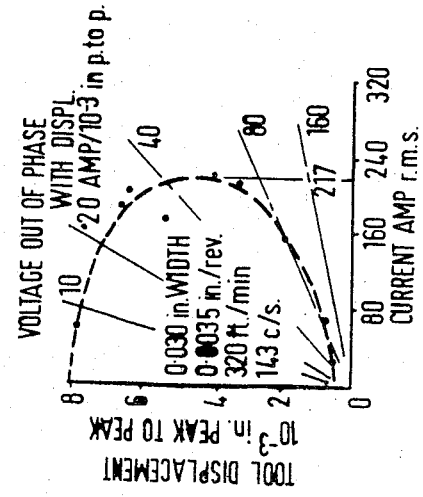
Figure 6:
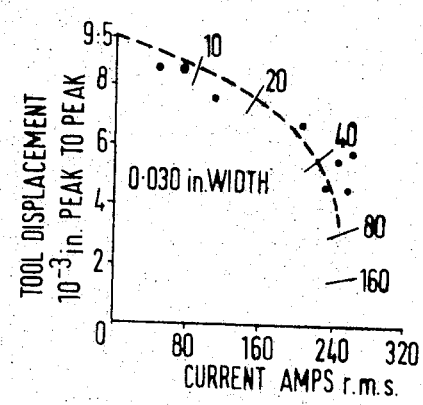
Figure 7:
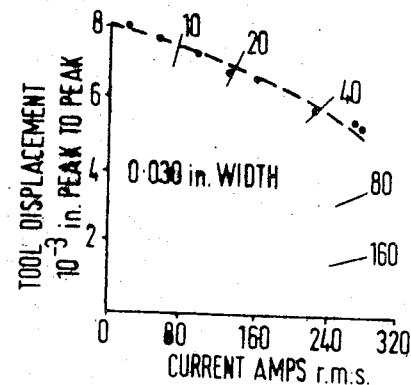
Figure 8:
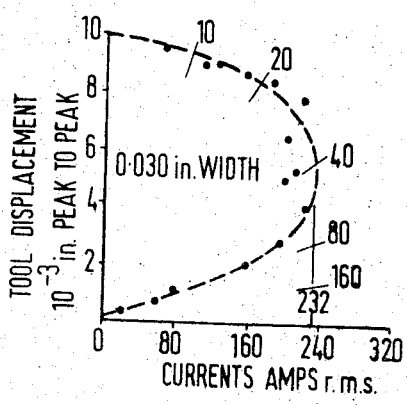
Figure 9:
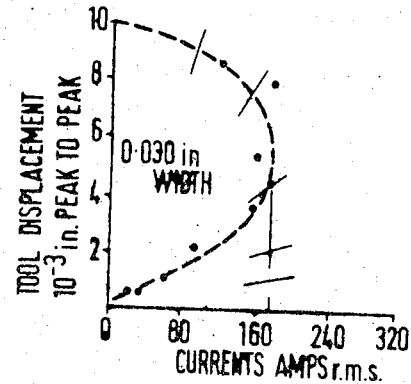

It is clear that the best results were obtained with the voltage leading the displacement by 137° as indicated in FIG. 9. FIGS. 4 and 5 show that good results are obtained when the voltage is out of phase with the displacement and these good results are maintained throughout the area between out of phase and voltage leading displacement by 90°. On the other hand FIGS. 6 and 7 show that the amplitude of vibration cannot be reduced by any reasonable current (note 240 amps still has not reduced the displacement) when the voltage is in phase with the displacement or is leading the displacement by 90°. FIG. 8 is similar to FIG. 5 but shows that conditions for a cut of thirty-thousandths of an inch in width in FIG. 8 as against forty-thousandths of an inch in width in FIG. 5.

In a series of tests using a carbide tipped tool, zero rake angle in EN2 steel advancing at 0.0035 inch per rev. and 320 feet per minute, the following results were obtained:
1. Without stabilization
    Critical width of cut in the range 0.20 inch to 0.025 inch.
2. With stabilization
    Critical width of cut in the range 0.060 inch to 0.080 inch at a system given of 450 amps r.m.s./10$^{-3}$ in.

I claim:
1. A method of controlling and reducing the amplitude of vibration of a machine tool during machining of a workpiece comprising measuring the frequency of vibration of a machine tool during use of the machine tool, producing pulses of electrical current at the frequency of the vibration, and applying the pulses of current to the cutting zone, in a predetermined phase relationship to the tool vibration, so as to heat the cutting zone, thereby reducing or at least limiting the amplitude of vibration.

2. A method according to claim 1 and in which the frequency of vibration is obtained by measuring dynamic tool displacement.

3. A method according to claim 1 and in which the frequency of vibration is obtained by measuring dynamic cutting forces.

4. A method according to claim 1 including the steps of adjusting the phase relationship between the heating pulses in the tool vibration and then increasing the system gain until stabilization is obtained with virtually zero current.

5. An apparatus for controlling and reducing the amplitude of vibration of a machine tool during machining of a workpiece, the apparatus including a transducer adapted to produce a signal indicative of the frequency of vibration of the tool, means to produce a series of pulses of electrical current which are in a predetermined phase relationship to the vibration, and means to apply the current across the tool/workpiece area to heat this area and thus to reduce the amplitude of vibration of the tool.

6. Apparatus according to claim 5 including a phase correction circuit, so that the phase of the heating current pulses can be altered relatively to the phase of the tool vibration.

7. Apparatus according to claim 5 and including means for converting the transducer signal to a series of pulses preferably by half wave rectification and a power amplifier to amplify the pulses so as to provide sufficient heating current.

8. Apparatus according to claim 5 and including means to vary the gain of the system, the gain being defined as the electrical current in amps divided by the amplitude of vibration.